T. RIGBY.
GETTING OR EXCAVATING PEAT.
APPLICATION FILED MAY 11, 1912.
1,144,249.
Patented June 22, 1915.
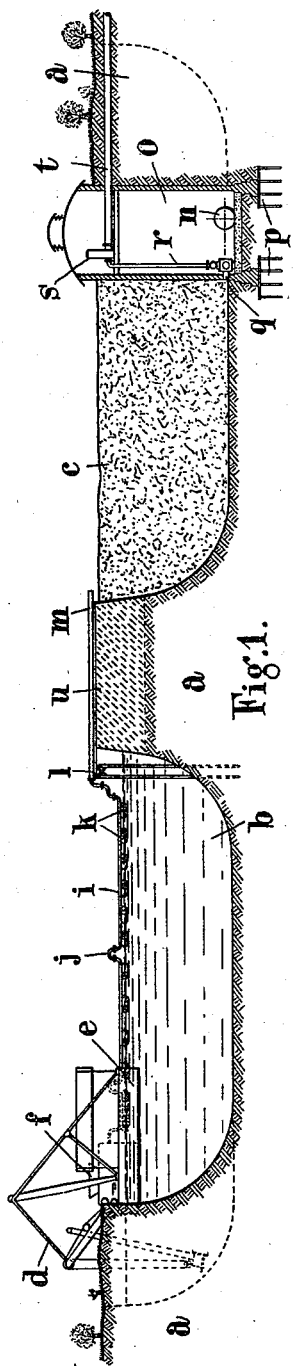
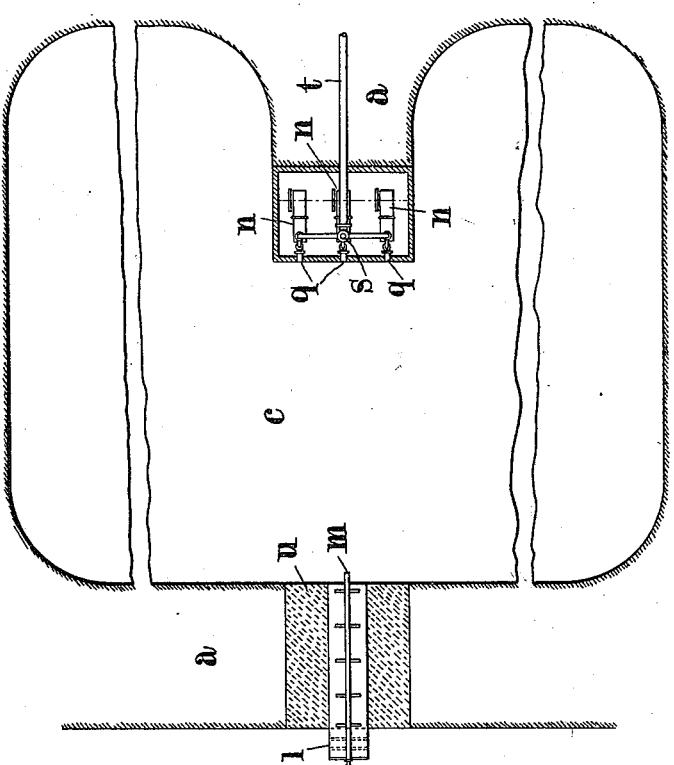
Inventor
Thomas Rigby
BY
Attorney.

UNITED STATES PATENT OFFICE.

THOMAS RIGBY, OF DUMFRIES, SCOTLAND, ASSIGNOR, BY MESNE ASSIGNMENTS, TO WETCARBONIZING LIMITED, OF LONDON, ENGLAND.

GETTING OR EXCAVATING PEAT.

1,144,249. Specification of Letters Patent. Patented June 22, 1915.

Application filed May 11, 1912. Serial No. 696,798.

*To all whom it may concern:*

Be it known that I, THOMAS RIGBY, engineer, a subject of the King of Great Britain and Ireland, and residing at Station Hotel, Dumfries, Scotland, have invented certain new and useful Improvements in and Relating to the Getting or Excavating of Peat, of which the following is a specification.

This invention relates to the gathering of peat, and has for its object to insure continuity of supply of peat from the bog or other deposit which is being worked, to the locality at which it is being employed, *e. g.*, peat carbonizing apparatus situated near the bog, independently of cold winter temperatures, which result in freezing of the bog or deposit, and generally produce periods when gathering becomes impossible and work is interrupted.

This invention consists in a method of gathering peat in which an excavation of the bog or deposit of limited size, but of capacity to contain a supply of peat sufficient for the cold period is kept distinct from the main excavation of the bog, and is used to contain a sufficient quantity of the peat for the normal working during the cold period, the excavation being of such depth that freezing cannot under ordinary cold conditions occur to excessive extent.

This invention also consists in the improvements in and relating to the gathering of peat hereinafter indicated.

In carrying this invention into effect in one form, and employing the method of gathering peat, in which the excavating implement delivers the material directly to a disintegrator or pulverizer, wherein it is converted into a watery pulp, which is then pumped through a pipe line to the desired locality, *e. g.*, a peat carbonizing installation, one first excavates in the usual way a certain area to such a depth that when peat is stored in it, the temperatures which occur in the cold season will be insufficient to cause more than a surface freezing. The capacity of this excavation is made such as to contain a supply of the peat sufficient for say six months of normal working. The peat excavated is sent through the pipe line and employed in the usual course. When the desired size of excavation has been attained, work is now commenced on the main portion of the bog, and the pontoons bearing the excavator, disintegrator and pump may be floated into the main excavation by cutting away a portion of the uncut bog forming the wall between the excavations, which cutting is subsequently dammed up. The operation of gathering is now carried on in the usual way in the main excavation, care being always taken that a sufficient supply of material is kept stored in the first excavation to tide over the close season. It will be evident therefore that the working capacity of the peat gathering appliances—excavator, pump and disintegrator—will need to be greater than is necessary to supply the installation at normal working, since after a period when the material stored in the first excavation has been drawn upon, peat will have to be supplied both to re-fill the excavation, and for the supply of the factory. It is desirable to install a permanent pumping station in the first excavation with a peat intake situated well below the normal surface of the peat, so that the material may be supplied with the assistance of gravity.

The freezing of a bog even under the severest conditions does not extend to a very great depth (*e. g.*, for North Britain some six inches), and by making the excavation which acts as the store sufficiently deep, the greater bulk of the peat may be kept unfrozen, and be taken in at the submerged intake, the freezing being also retarded by the circulation which occurs in the watery disintegrated peat which the excavation contains.

It will be observed that by the present invention an installation requiring a supply of peat becomes independent of severe winter conditions, and may run uninterruptedly. Again, the provision of the store of material entails no outlay in construction or otherwise of the store, as the same forms part of the bog itself, and is produced in the normal working operations.

An installation of the nature above described is diagrammatically shown in the accompanying drawings, in which—

Figure 1 shows a sectional elevation of the same, and Fig. 2 a part sectional plan thereof.

In these drawings, *a* represents a peat bog in which is the main cutting *b* which is being operated on, and the deep store area *c*. Peat is gathered in the cutting *b* by a bucket excavator *d* mounted on a lighter *e*, and the same is delivered into a disintegrator $f$, mounted with a pump and power installation $g$ upon a pontoon $h$. The material is in this way fed directly from the bucket of the excavator into the disintegrator, and after reduction to the condition of a substantially uniform fluid pulp, is by the pump sent through the pipe line composed of lengths of pipe $i$, connected by swivel joints $j$, and buoyed by floating elements $k$. At the edge of this main cutting is a platform $l$, upon which is a fixed section of pipe line $m$. This pipe $m$ delivers the material into the store area $c$, in which it collects, and from which it is passed on to the factory by pumps $n$, situated at the bottom of a pump pit $o$, constructed in the store area. This pump pit is constructed to reach to the bottom of the store area, and sufficiently solid foundations $p$ are provided therefor. The pumps take in at $q$, at the bottom of the store area, and one or more of these pumps may be brought into use according to the demand for material at the factory. For convenience, separate intakes are provided for each pump. The pumps, however, supply a common duct $r$, which feeds into a pressure equalizer $s$, whence the material passes directly through the pipe line $t$, disposed in a trench to the factory. In the putting down of such an installation, it is convenient first to cut out an area $c$, after which a narrow cutting can be made, and work commenced in a new area, the lighter and pontoons carrying the gathering plant being floated into this new area through the narrow cutting referred to. Once the gathering plant has been floated into the new area, the cutting can be closed up, as shown at $u$, to form a foundation for the platform $m$, and to isolate the area $c$ from the main area $b$, upon which work now proceeds. The formation of the store area can in this way be caused to occur as one of the natural steps in the work on the bog, without involving the special construction of any embankments or the like.

It is to be understood that the method of carrying the invention into effect above described is referred to by way of example only, and that the same may be very considerably varied without departing from the spirit of the present invention.

Having now described my invention what I claim as new and desire to secure by Letters Patent is:—

1. A method of gathering peat in which the peat is excavated, disintegrated until reduced to a pulp of watery fluidity, then transported by pumping, and thereafter stored as pulp in an excavation in the bog.

2. A method of obtaining a continuous supply of peat from a bog, in which part of the latter is excavated to form a store, whereupon peat is excavated from another part of the bog, then disintegrated until reduced to a pulp of watery fluidity, and transported by pumping in this condition to said store, from which it is drawn off as required.

3. A method of obtaining a continuous supply of peat from a bog, according to which the peat is excavated, then reduced to a pulp of watery fluidity by disintegration in the undrained condition, and the pulp then conveyed to the desired locality by pumping, whereupon on the excavation becoming sufficiently large, work is commenced on another part of the bog, and the peat therefrom in the form of pulp conveyed by pumping to the part of the bog which was first excavated, wherein it is stored until required.

4. A method of obtaining a continuous supply of peat from a bog, in which peat is excavated, disintegrated until reduced to a pulp of watery fluidity, conveyed in this condition to the desired locality by pumping, whereupon on the excavation thus formed being large enough to be capable of storing sufficient peat to tide over the cold season, the excavation is partitioned off from the part of the bog in which excavating is continued, and the peat pulp conveyed to the partitioned off part of the bog, where it is stored until required.

5. In the transportation of peat hydraulically as a fluid pulp to a peat treating installation adjoining the deposit, the method in which the peat is cut from the deposit, forthwith macerated to watery fluidity, then forced to flow through an inclosed duct into and accumulate in an adjacent but entirely distinct cutting in the deposit itself, and then withdrawn from the bottom of this accumulation and forced through a further inclosed duct to the treating installation.

In testimony whereof I have affixed my signature in the presence of two witnesses.

T. RIGBY.

Witnesses:
E. C. WALKER,
B. H. MATTHEWS.